(12) United States Patent
Hsu et al.

(10) Patent No.: US 8,927,657 B2
(45) Date of Patent: Jan. 6, 2015

(54) METHOD FOR PRODUCING EPOXIDIZED POLYMER

(75) Inventors: Chih-Wei Hsu, Kaohsiung (TW); Hung-Chieh Hou, Pingtung (TW)

(73) Assignee: TSRC Corporation, Taipei (TW)

( * ) Notice: Subject to any disclaimer, the term of this patent is extended or adjusted under 35 U.S.C. 154(b) by 0 days.

(21) Appl. No.: 13/250,636

(22) Filed: Sep. 30, 2011

(65) Prior Publication Data
US 2012/0309907 A1 Dec. 6, 2012

(30) Foreign Application Priority Data

May 31, 2011 (TW) .............................. 100119079 A (51) Int. Cl.
| | |
|---|---|
| *C08C 19/06* | (2006.01) |
| *C08F 8/08* | (2006.01) |
| *C08F 36/06* | (2006.01) |
| *C08F 136/06* | (2006.01) |
| *C08F 236/10* | (2006.01) |

(52) U.S. Cl.
CPC ...................................... *C08C 19/06* (2013.01)
USPC .................. 525/332.3; 525/331.9; 525/332.8; 525/332.9; 525/333.2; 525/360; 525/370; 525/387

(58) Field of Classification Search
CPC ........... C08C 19/06; C08F 8/08; C08F 19/06; C08F 36/04; C08F 36/08; C08F 136/04; C08F 136/06; C08F 136/08; C08F 236/10
USPC .......... 525/331.9, 332.3, 332.8, 332.9, 333.2, 525/360, 370, 387
See application file for complete search history.

(56) References Cited

U.S. PATENT DOCUMENTS

| | | | | |
|---|---|---|---|---|
| 5,274,140 | A * | 12/1993 | Venturello et al. | ............ 549/531 |
| 5,840,809 | A | 11/1998 | Ohtsuka et al. | |
| 2010/0331497 | A1* | 12/2010 | Vogel et al. | .................. 525/451 |

FOREIGN PATENT DOCUMENTS

| | | |
|---|---|---|
| EP | 0845486 A1 | 6/1998 |
| EP | 1080084 B1 | 5/2004 |
| WO | WO 91/14694 | * 10/1991 |

OTHER PUBLICATIONS

Wikipedia article "Chelation", http://en.wikipedia.org/wiki/Chelation, Jan. 2014.*

* cited by examiner

*Primary Examiner* — Roberto Rabago
(74) *Attorney, Agent, or Firm* — Smell & Wilmer L.L.P.

(57) ABSTRACT

The present invention discloses a method for producing an epoxidized polymer. The method comprises the steps of: (1) providing a polymer solution containing a polymer having a conjugated diene group; (2) providing a catalyst solution dissolved in the polymer solution, the catalyst solution containing a transition metal ion and a ligand for bonding to the transition metal ion, the transition metal ion being selected from the group consisting of Ti, Mn, V, Mo, W and any combination thereof; and (3) epoxidizing double bonds of the conjugated diene group to produce the epoxidized polymer by providing an epoxidizing agent dissolved in the polymer solution containing the catalyst solution, wherein the epoxidizing agent is meta-chloroperoxybenzoic acid (mCPBA) or analogs thereof.

10 Claims, 8 Drawing Sheets

METHOD FOR PRODUCING EPOXIDIZED POLYMER

RELATED APPLICATIONS

This application claims the right of priority based on Taiwan Patent Application No. 100119079, entitled "METHOD FOR PRODUCING EPOXIDIZED POLYMER," filed on May 31, 2011. The entire content of the aforementioned application is incorporated herein by reference.

BACKGROUND OF THE INVENTION

1. Field of the Invention

This invention is related to a method for epoxidizing an unsaturated polymer, and more particularly, related to a method for epoxidizing a polymer having a conjugated diene group by using a homogeneous catalyst.

2. Description of the Prior Art

Polymers with a conjugated diene group or polymers with a vinyl aromatic group and a conjugated diene group, such as butadiene polymers, styrene-butadiene or styrene-isoprene polymers, have been successfully commercialized and applied to elasticity materials, adhesives, polymer modifiers, etc. because of excellent elasticity. To expand the application of those polymers, many efforts have been made to epoxidizing of conjugated diene group to enhance the polarity and then get the compatibility with much polar polymer and metal.

The conventional technology of epoxidization of conjugated diene group is mainly prepared by epoxidizing the unsaturated double bond of polymer with acetic ester as catalyst and peroxide as oxidant, as illustrated in U.S. Pat. No. 5,840,809. However, different challenges still exist for each application. For example, in the conventional technology, the epoxidized polymer needs to proceed many cycles of extraction and standing still to get purified product. The procedure is very complicated and time consuming. Therefore, only continuous research for various novel epoxidizing polymerizations can meet all the criteria of different applications.

SUMMARY OF THE INVENTION

This invention provides a method for epoxidizing a polymer having a conjugated diene group. The epoxidation is for an unsaturated double bond of the conjugated diene group. This invention has at least one feature as described as follows: suitable for all kinds of polymers having a conjugated diene group, comprising a polymer having a vinyl aromatic group and a conjugated diene group; using a homogeneous catalyst to proceed the epoxidation reaction; the transformation rate of the epoxidation for transforming the unsaturated double bond of the conjugated diene group is 5% to 60%; the epoxidation can be proceeded at mild condition, such as at 20° C. to 70° C. at atmosphere; short reacting time and simple purifying procedure.

In one embodiment, this invention provides a method for producing an epoxidized polymer, comprising the steps of: (1) providing a polymer solution containing a polymer having a conjugated diene group; (2) providing a catalyst solution dissolved in the polymer solution, the catalyst solution containing a transition metal ion and a ligand for bonding to the transition metal ion, the transition metal ion being selected from the group consisting of Ti, Mn, V, Mo, W and any combination thereof; and (3) epoxidizing double bonds of the conjugated diene group to produce the epoxidized polymer by providing an epoxidizing agent dissolved in the polymer solution containing the catalyst solution, wherein the epoxidizing agent is meta-chloroperoxybenzoic acid (mCPBA) or analogues thereof.

In another embodiment, this invention provides a method for producing an epoxidized polymer, comprising the steps of:

(1) providing a polymer solution containing a polymer having a conjugated diene group and an vinyl aromatic group;

(2) providing a catalyst solution dissolved in the polymer solution, the catalyst solution containing a transition metal ion and a ligand for bonding to the transition metal ion, the transition metal ion being selected from the group consisting of Ti, Mn, V, Mo, W and any combination thereof; and (3) epoxidizing double bonds of the conjugated diene group to produce the epoxidized polymer by providing an epoxidizing agent dissolved in the polymer solution containing the catalyst solution, wherein the epoxidizing agent is meta-chloroperoxybenzoic acid (mCPBA) or an analogue thereof.

This invention further comprises other solutions to solve other problems as described in more detail below.

DETAILED DESCRIPTION OF THE EMBODIMENTS

The preferred embodiments according to this invention are described and demonstrated in connection with the following figures. Descriptions of conventional elements, related materials and procedures are omitted to avoid misunderstanding.

Polymer and the Process Thereof

The polymers used in accordance with the invention comprise at least one conjugated diene group. There are many kinds of polymers that can be used in accordance with this invention, comprising homopolymers having only conjugated diene monomer and copolymers having groups coexisting with conjugated diene group. For example, the monomer, which can form the conjugated diene group, is independently selected from the group consisting of 1,3-butadiene, 2,3-dimethyl-1,3-butadiene, 3-butyl-1,3-octadiene, isoprene, 1-methylbutadiene, 2-phenyl-1,3-butadiene and any combination thereof.

Besides the conjugated diene group, there are other functional groups which can coexist with the conjugated diene group, such as a vinyl aromatic group. The monomer, which is used to form the vinyl aromatic group, is independently selected from the group consisting of styrene, all isomers of the methylstyrene, all isomers of the ethylstyrene, cyclohexylstyrene, vinyl biphenyl, 1-vinyl-5-hexyl naphthalene, vinyl naphthalene, vinyl anthracene and any combination thereof. In one embodiment, the weight percent of the vinyl aromatic group is 5% to 95% and the weight percent of the conjugated diene group is 5% to 95% in the copolymer of vinyl aromatic group and conjugated diene group. The copolymer of vinyl aromatic group and conjugated diene group can be a random copolymer or a block copolymer. The structure of the copolymer is variable. It can be a triblock copolymer, such as vinyl aromatic group-conjugated diene group-vinyl aromatic group or conjugated diene group-vinyl aromatic group-conjugated diene group. It also can be a pentablock copolymer, such as vinyl aromatic group-conjugated diene group-vinyl aromatic group-conjugated diene group-vinyl aromatic group. The structure of the block copolymer can be linear type, branch type or radiated type. The suitable group, which can coexist with the conjugated diene group, also can comprise an acrylonitrile group, such as acrylonitrile monomer or methylacrylonitrile monomer, etc.

According to the embodiments of this invention, the total weight-average molecular weight of the polymer is 5,000 to 500,000, preferably 10,000 to 200,000, more preferably 20,000 to 120,000. The total weight-average molecular weight is determined by gel permeation chromatography (GPC). It is well-known for a person skill in the art. The total weight-average molecular weight of the epoxidized polymer also can be determined by using this method.

The polymer above-mentioned can be obtained in business market or manufactured by a suitable process. In other words, this invention does not limit the method for manufacturing the polymer.

Epoxidized Polymer and the Process Thereof

The epoxidized polymer is a product obtained by epoxidizing the unsaturated double bond of the conjugated diene group of the polymer above-mentioned. According to the preferred embodiment of this invention, the total weight-average molecular weight of the polymer is 5,000 to 500,000, preferably 10,000 to 200,000, more preferably 20,000 to 120,000. The total weight-average molecular weight is measured by gel permeation chromatography (GPC). It is well-known for a person skill in the art.

According to the preferred embodiment of this invention, the method for producing an epoxidized polymer comprises the steps of:

Step (1): providing a polymer solution containing a polymer having a conjugated diene group;

Step (2): providing a catalyst solution dissolved in the polymer solution, the catalyst solution containing a transition metal ion and a ligand for bonding to the transition metal ion;

Step (3): epoxidizing double bonds of the conjugated diene group to produce the epoxidized polymer by providing an epoxidizing agent dissolved in the polymer solution;

Step (4): after step (3), producing a precipitate of the epoxidized polymer by using an alcohol solvent.

Regarding step (1) refer to the description above-mentioned to understand the polymer used in this invention. In this step, the polymer was dissolved in a suitable organic solvent to form a homogeneous solution. According to the preferred embodiment of this invention, the dissolution can proceed at room temperature and normal pressure. The organic solvent is selected from the group consisting of cyclohexane, toluene, tetrahydrofuran, xylene and any combination thereof.

Regarding to step (2), the transition metal ion included in the catalyst solution is selected from the group consisting of Ti, Mn, V, Mo, W and any combination thereof according to the invention. Step (2) further comprises: providing a ligand for bonding to the transition metal ion. Any kind of suitable ligand can be used. For example, the ligand is preferable selected from the group consisting of bipyridine, N,N'-ethylenebis(salicylimine) (Salen), tetramethylethylenediamine (TMEDA), 2-methyl-pyridine and any combination thereof. The following preferred embodiment described the bipyridine and Salen as a ligand. However, it could be understand by the person skill in the art that tetramethylethylenediamine and 2-methyl-pyridine also can be used as a ligand. That is because those can be used to chelate the transition metal ion above-mentioned and adjust the oxidation condition. The selected transition metal ion and the ligand can be mixed in a suitable solvent and then dissolved at room temperature and normal pressure to form a catalyst solution. Then, the catalyst solution was dissolved in the polymer solution above-mentioned at room temperature and normal pressure. It will be seen from this that the epoxidizing reaction is designed to finish in homogeneous system. Regarding to the concentration of the catalyst, it depends on the amount of the unsaturated double bond contained in the conjugated diene group of the polymer. It should be noticed that even the step (2) of the comparative example of this invention was omitted; the double bond of the conjugated diene group also can be epoxidized. The step (2) can improve the transformation rate of the epoxidation.

Regarding step (3), in each preferred embodiment, the epoxidizing agent is meta-chloroperoxybenzoic acid (mCPBA). However, it should be noted that the epoxidizing agent of this invention also includes an analogue of meta-chloroperoxybenzoic acid (mCPBA), which can achieve similar results of the epoxidation of the double bond of the conjugated diene group. The concentration of the epoxidizing agent depends on the amount of the unsaturated double bond contained in the conjugated diene group of the polymer. The epoxidizing reaction can proceed at normal pressure. Preferably, the reaction temperature is between 20° C. to 70° C. As for the reaction time, it depends on the content of the reactant, existing of the catalyst and reaction temperature. Usually, the reaction time can be controlled to be between 2 hrs to 24 hrs. It can be controlled to be 2 hrs at room temperature 25° C. and normal pressure with catalyst.

Step (4) is the step that is used to separate the product after the epoxidizing reaction. In this step, an alcohol solvent is added into the final solution. The epoxidized polymer was precipitated by changing the polarization of the solution and then obtained by filtering it. The alcohol solvent can be methanol or other suitable alcohol solvent. This step can proceed one time or more than one time.

After the epoxidizing reaction, the transformation rate for transforming the double bond into the epoxy group can be determined by H1-NMR. According to this invention, the transformation rate for transforming the double bond into the epoxy group is 5% to 60%, preferably 5% to 40%, more preferably 5% to 30%. The measurement of the transformation rate of double bond-epoxy group can be referred to FIG. 1-8, wherein the transformation rate E %=($I_{Oxirane}$)($I_{double\ bond}$+$I_{Oxirane}$); $I_{Oxirane}$ represents the integration of absorption peak of the oxirane group (i.e., the epoxy group); $I_{double\ bond}$ represents integration of absorption peak of un-epoxidized double bond group.

The preferred embodiments of this invention are described as below:

Comparative Example 1

Without Catalyst Epoxidized SBS
(Styrene-Butadiene-Styrene Block Polymer)

3 g SBS (the molecular weight is about 100,000; trade name is Taipol SBS-4202; manufactured by TSRC corp.) was fully dissolved in 60 ml cyclohexane. Adding a certain amount (0.7512 g) of mCPBA into the SBS solution and reacting at room temperature for 24 hrs. After reaction, the product was precipitated by 100 ml methanol for several times to be purified and isolated. According to H1-NMR determination, the transformation rate of double bond-epoxy group was about 2.1%, as shown in FIG. 1.

Figure 1:
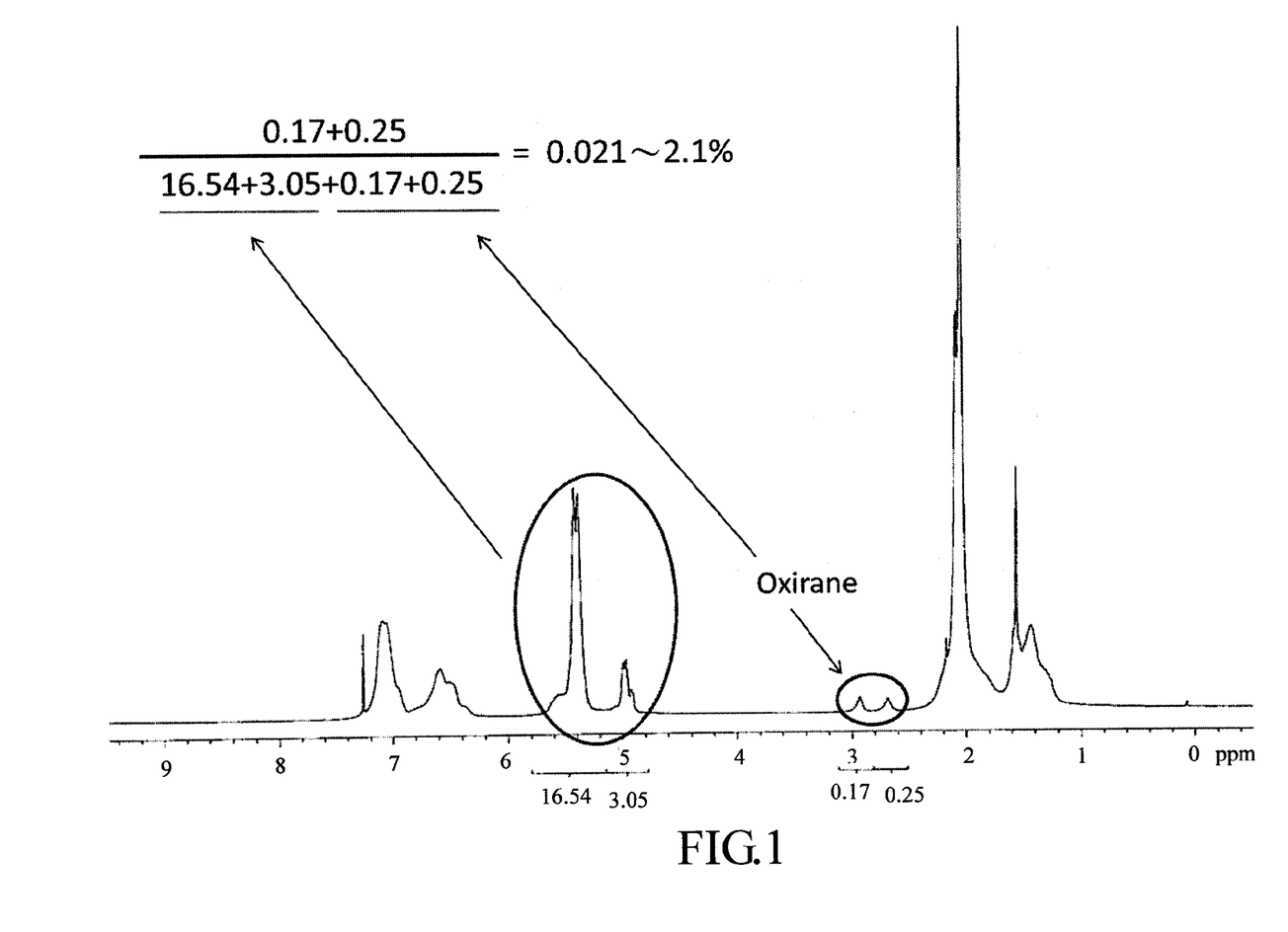
FIGS. 1 to 8 are the H-NMR spectrograms of the epoxidized block polymer according to Examples 1-8.

Referring to FIG. 1, peak 4.8-5.6 ppm represents the absorption peak of the remaining double bond which is not epoxidized after epoxidizing the SBS polymer. Peak 2.6-3.0 ppm represents the absorption peak of the oxirane.

Example 2

Using Ti/Salen Epoxidized SBS (Styrene-Butadiene-Styrene Block Polymer)

Figure 2:
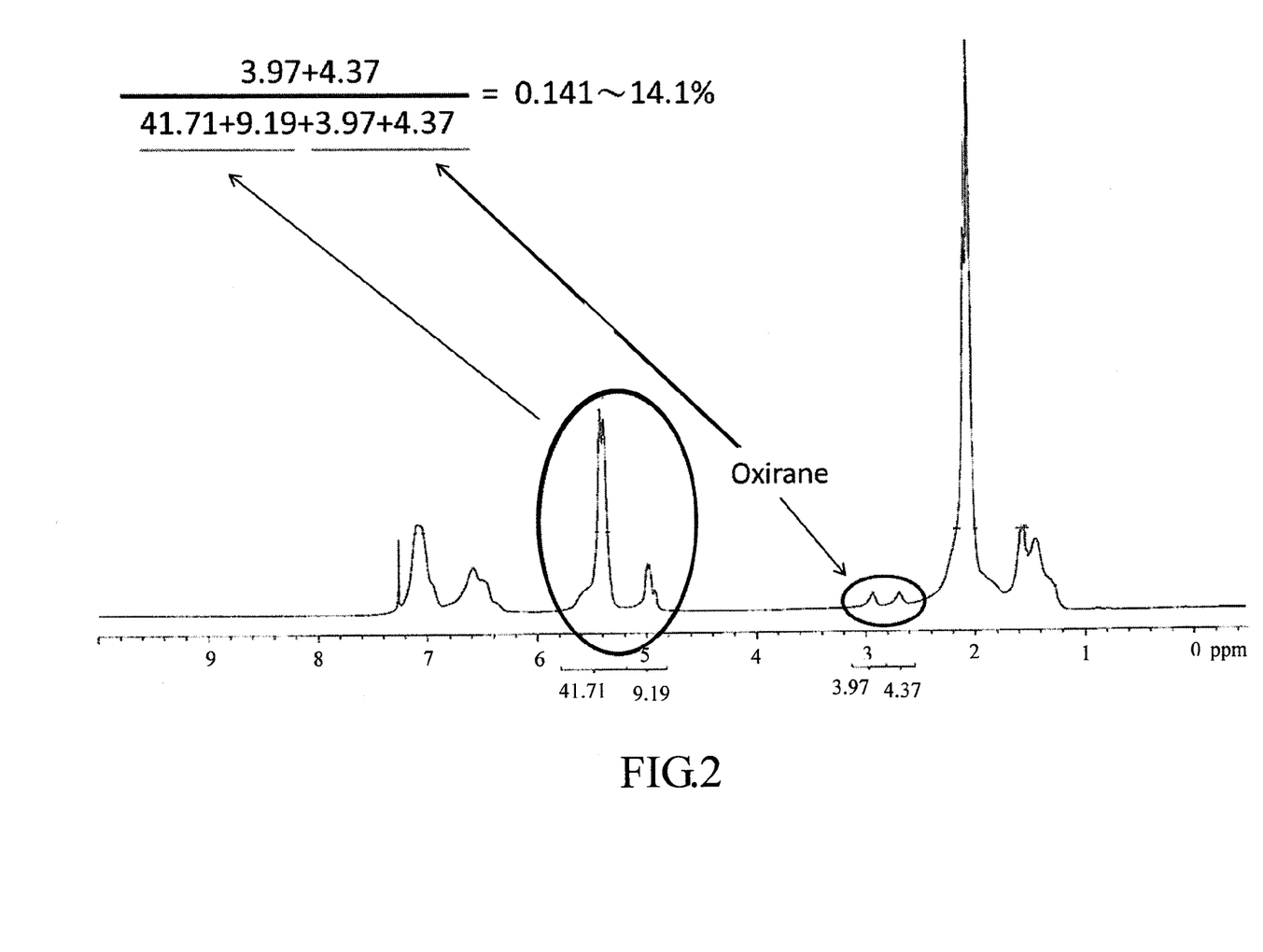

3 g SBS (the molecular weight is about 100,000; trade name is Taipol SBS-4202 manufactured by TSRC corp.) was fully dissolved in 60 ml cyclohexane. 1.2374 g titanium isopropoxide and 1.1680 g Salen with same mole as a ligand were dissolved into 30 ml tetrahydrofuran to form a catalyst solution. Then, the epoxidized catalyst solution was added into the SBS solution. Next, a certain amount (0.7512 g) of meta-chloroperoxybenzoic acid (mCPBA) was added into the above-mentioned SBS solution containing the catalyst, and reacting at 25° C. for 2 hrs. After reaction, the product was precipitated by 100 ml methanol for several times to be purified and isolated. According to H1-NMR determination, the transformation rate of the double bond was about 14.1% (as shown in FIG. 2). The transformation rate of double bond in this example is better than that of Example 1, which is without catalyst.

Referring to FIG. 2, peak 4.8-5.6 ppm represents the absorption peak of the remaining double bond which is not epoxidized after epoxidizing the SBS polymer. Peak 2.6-3.0 ppm represents the absorption peak of the oxirane.

Example 3

Using Mn/Bipyridine Epoxidized SBS (Styrene-Butadiene-Styrene Block Polymer)

Figure 3:
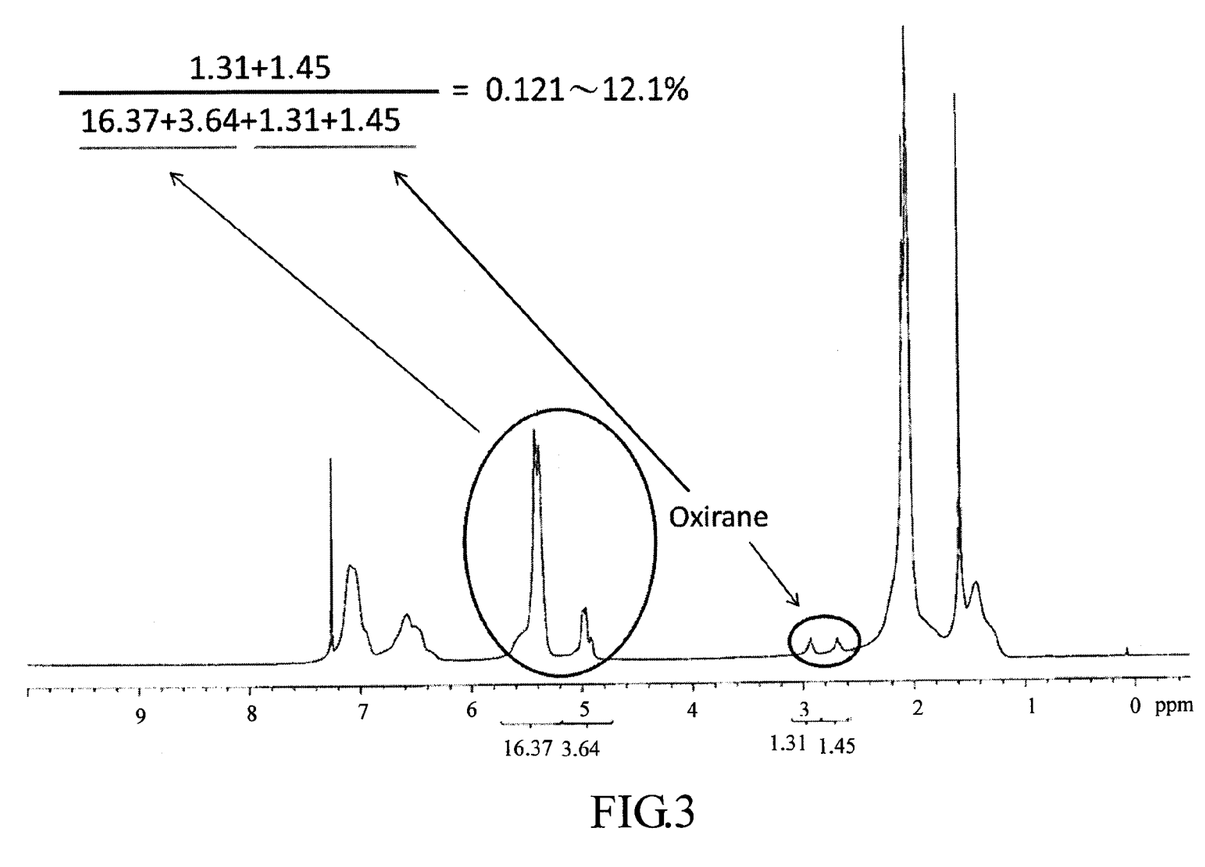

3 g SBS (the molecular weight is about 100,000; trade name is Taipol SBS-4202 manufactured by TSRC corp.) was fully dissolved in 60 ml cyclohexane. 0.2102 g manganese sulphate and 0.1942 g bipyridine with same mole as a ligand were dissolved into 30 ml tetrahydrofuran to form a catalyst solution. Then, the epoxidized catalyst solution was added into the SBS solution. Next, a certain amount (0.7512 g) of meta-chloroperoxybenzoic acid (mCPBA) was added into the above-mentioned SBS solution containing the catalyst, and reacted at 25° C. for 2 hrs. After reaction, the product was precipitated by 100 ml methanol for several times to be purified and isolated. According to H1-NMR determination, the transformation rate of the double bond was about 12.1% (as shown in FIG. 3). The transformation rate of double bond in this example is better than that Example 1, which is without catalyst.

Referring to FIG. 3, peak 4.8-5.6 ppm represents the absorption peak of the remaining double bond which is not epoxidized after epoxidizing the SBS polymer. Peak 2.6-3.0 ppm represents the absorption peak of the oxirane.

Example 4

Using Mn/Bipyridine Epoxidized SIS (Styrene-Isoprene-Styrene Block Polymer)

3 g SIS (the molecular weight is about 120,000; trade name is Taipol SIS-2411 manufactured by TSRC corp.) was fully dissolved in 60 ml cyclohexane. 0.2102 g manganese sulphate and 0.1942 g bipyridine with same mole as a ligand were dissolved into 30 ml tetrahydrofuran to form a catalyst solution. Then, the catalyst solution was added into the SIS solution. Next, a certain amount (0.7512 g) of meta-chloroperoxybenzoic acid (mCPBA) was added into the above-mentioned SIS solution containing the catalyst, and reacted at 25° C. for 2 hrs. After reaction, the product was precipitated by 100 ml methanol for several times to be purified and isolated. According to H1-NMR determination, the transformation rate of the double bond was about 7.7% (as shown in FIG. 4).

Figure 4:
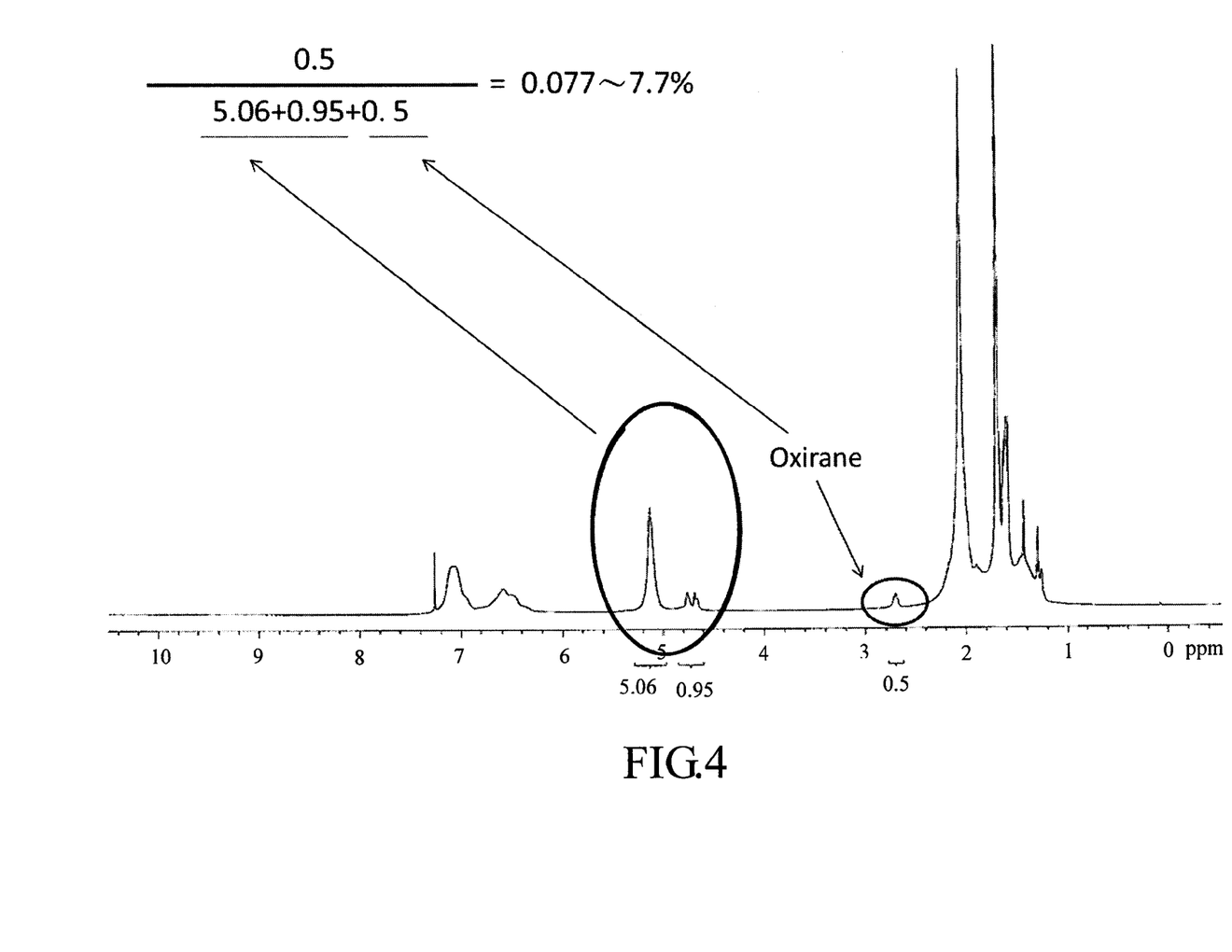

Referring to FIG. 4, peak 4.6-5.2 ppm represents the absorption peak of the remaining double bond which is not epoxidized after epoxidizing the SIS polymer. Peak 2.6-2.8 ppm represents the absorption peak of the oxirane.

Example 5

Using Mn/Bipyridine Epoxidized S(I/B)S (Styrene-(Isoprene/Butadiene)-Styrene Block Polymer)

Polymerization Procedure:

Cyclohexane is used as a solvent; wherein a small amount of tetrahydrofuran is added to adjust the polarization and sec-butyllithium is used as a polymerization initiator. The reaction monomers are styrene, butadiene and isoprene. The solvent, promoter and the monomer can be purified by activated alumina. The reaction was proceeded in a pressure kier with a stirrer. The reaction procedure is described as below:

1.1 adding 1,100 g cyclohexane and 4 g tetrahrdrofuran;
1.2 heating to 50° C.;
1.3 adding 22.3 g styrene;
1.4 adding 1.68 g initiator to initiate the reaction;
1.5 continuing the reaction for 30 mins;
1.6 adding a mixing monomer containing 46.65 g isoprene and 46.65 g butadiene;
1.7 continuing the reaction for 60 mins;
1.8 adding 22.3 g styrene;
1.9 continuing the reaction for 30 mins;
1.10 adding 0.2 g methanol as a termination agent to terminate the reaction.

After proceeding the procedure above-mentioned, 1,245 g solution was obtained, comprising S(I/B)S (styrene-(isoprene/butadiene)-styrene block polymer) having molecular weight 100,000. In this embodiment, the styrene monomer and the isoprene/butadiene monomer were added separately.

Epoxidation Procedure:

3 g S(I/B)S, synthesized by the procedure above-mentioned, was fully dissolved in 60 ml cyclohexane. 0.2102 g manganese sulphate and 0.1942 g bipyridine with same mole as a ligand were dissolved into 30 ml tetrahydrofuran to form a catalyst solution. Then, the catalyst solution was added into the S(I/B)S solution. A certain amount (0.7512 g) of meta-chloroperoxybenzoic acid (mCPBA) was added into the above-mentioned S(I/B)S solution containing the catalyst, and reacted at 25° C. for 2 hrs. After reaction, the product was precipitated by 100 ml methanol for several times to be purified and isolated. According to H1-NMR determination, the transformation rate of the double bond was about 12.2% (as shown in FIG. 5).

Figure 5:
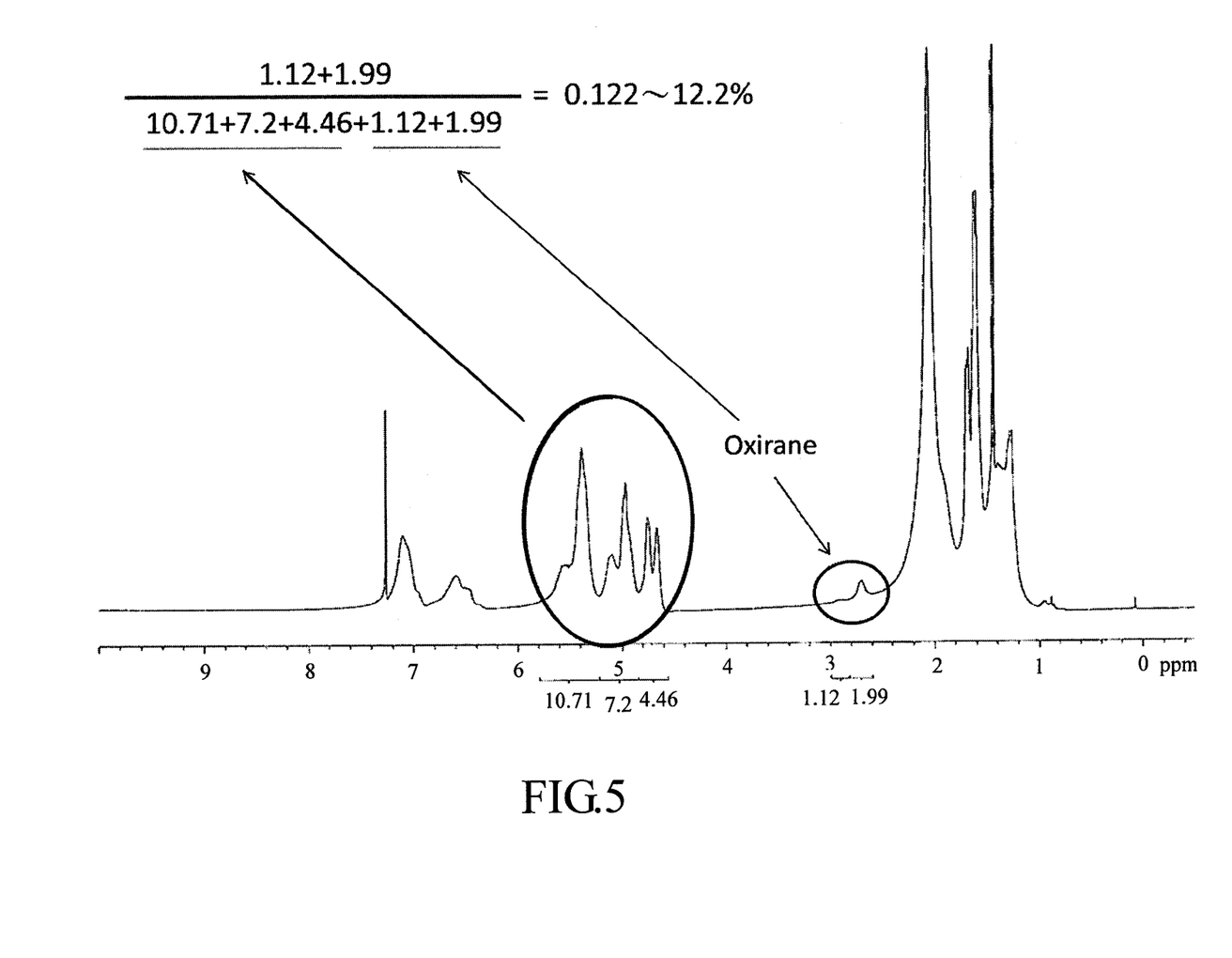

Referring to FIG. 5, peak 4.6-5.8 ppm represents the absorption peak of the remaining double bond which is not epoxidized after epoxidizing the S(I/B)S polymer. Peak 2.6-3.0 ppm represents the absorption peak of the oxirane.

Comparative Example 6

Without Catalyst Epoxidized BR (Butadiene Polymer)

3 g BR (the molecular weight is about 100,000; trade name is Taipol BR-0150 manufactured by TSRC corp.) was fully dissolved in 60 ml cyclohexane. A certain amount (3.0048 g) of meta-chloroperoxybenzoic acid (mCPBA) was added into the BR solution and reacted at 25° C. for 24 hrs. After reaction, the product was precipitated by 100 ml methanol for several times to be purified and isolated. According to H1-NMR determination, the transformation rate of the double bond was about 8.1% (as shown in FIG. 6).

Figure 6:
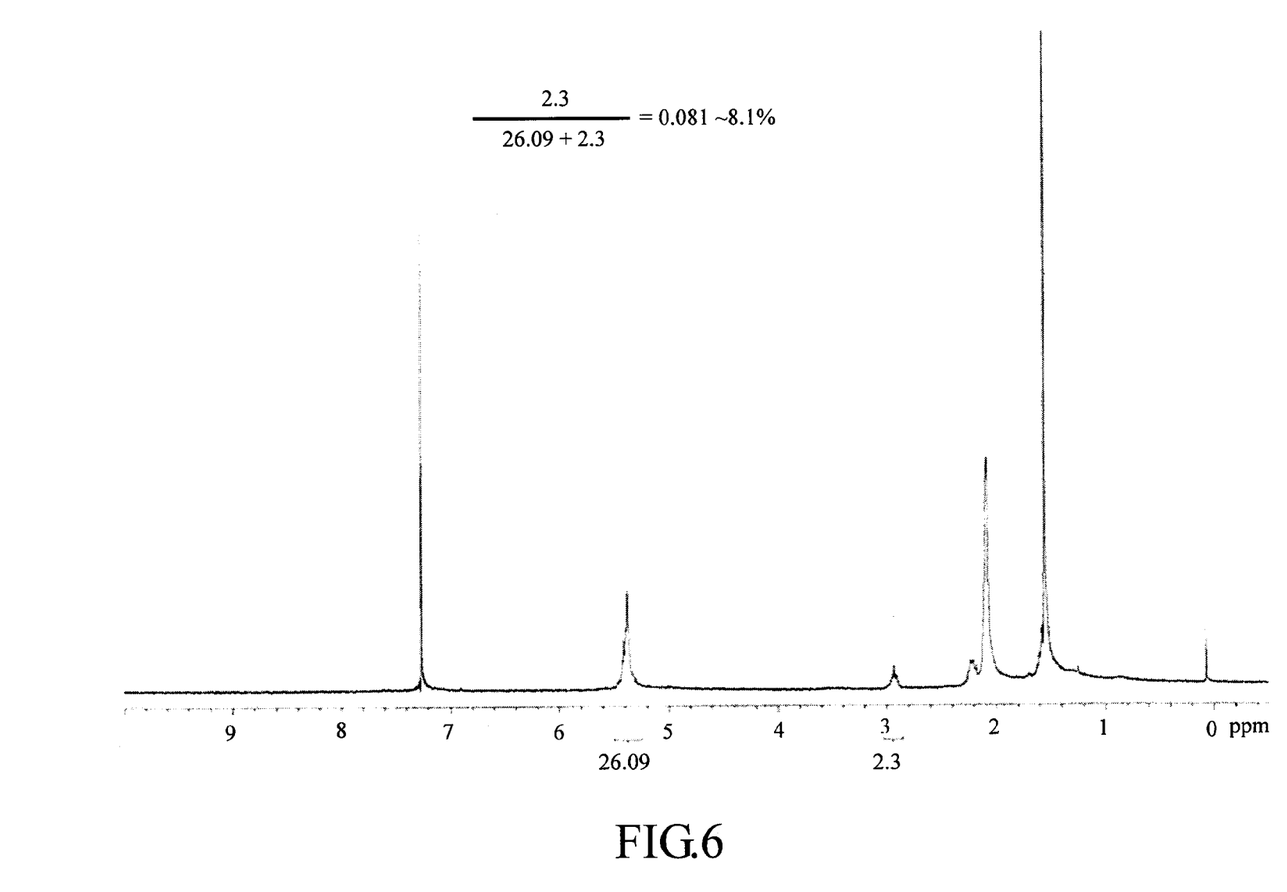

Referring to FIG. 6, peak 5.2-5.6 ppm represents the absorption peak of the remaining double bond which is not epoxidized after epoxidizing the BR polymer. Peak 2.8-3.0 ppm represents the absorption peak of the oxirane.

Example 7

Using Mn/Bipyridine Epoxidized BR (Butadiene Polymer)

3 g BR (the molecular weight is about 100,000; trade name is Taipol BR-0150 manufactured by TSRC corp.) was fully dissolved in 60 ml cyclohexane. 0.2102 g manganese sulphate and 0.1942 g bipyridine with same mole as a ligand were dissolved into 30 ml tetrahydrofuran to form a catalyst solution. Then, the catalyst solution was added into the BR solution. A certain amount (3.0048 g) of meta-chloroperoxybenzoic acid (mCPBA) was added into the above-mentioned BR solution containing the catalyst, and reacted at 25° C. for 2 hrs. After reaction, the product was precipitated by 100 ml methanol for several times to be purified and isolated. According to H1-NMR determination, the transformation rate of the double bond was about 11.3% (as shown in FIG. 7).

Figure 7:
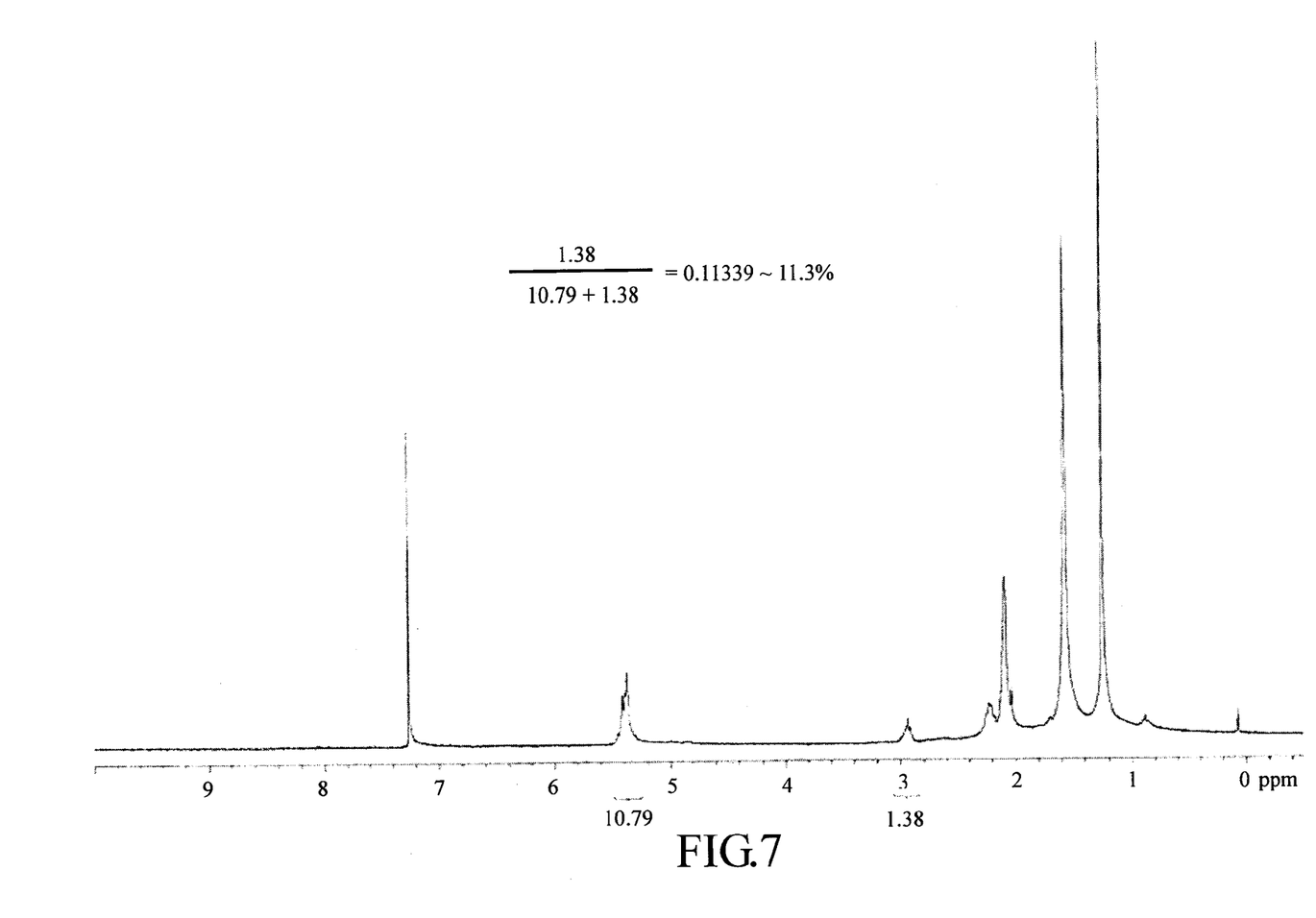

Referring to FIG. 7, peak 5.2-5.6 ppm represents the absorption peak of the remaining double bond which is not epoxidized after epoxidizing the BR polymer. Peak 2.8-3.0 ppm represents the absorption peak of the oxirane.

Example 8

Using Mn/Bipyridine Epoxidized SBS (Styrene-Butadiene-Styrene Block Polymer)

3 g SBS (the molecular weight is about 100,000; trade name is Taipol SBS-4202 manufactured by TSRC corp.) was fully dissolved in 60 ml cyclohexane. 0.2102 g manganese sulphate and 0.1942 g bipyridine with same mole as a ligand were dissolved into 30 ml tetrahydrofuran to form a catalyst solution. Then, the catalyst solution was added into the SBS solution. Next, a certain amount (3.0048 g, more than Example 3) of meta-chloroperoxybenzoic acid (mCPBA) was added into the above-mentioned SBS solution containing the catalyst, and reacted at 25° C. for 2 hrs. After reaction, the product was precipitated by 100 ml methanol for several times to be purified and isolated. According to H1-NMR determination, the transformation rate of the double bond was about 26.4% (as shown in FIG. 8).

Figure 8:
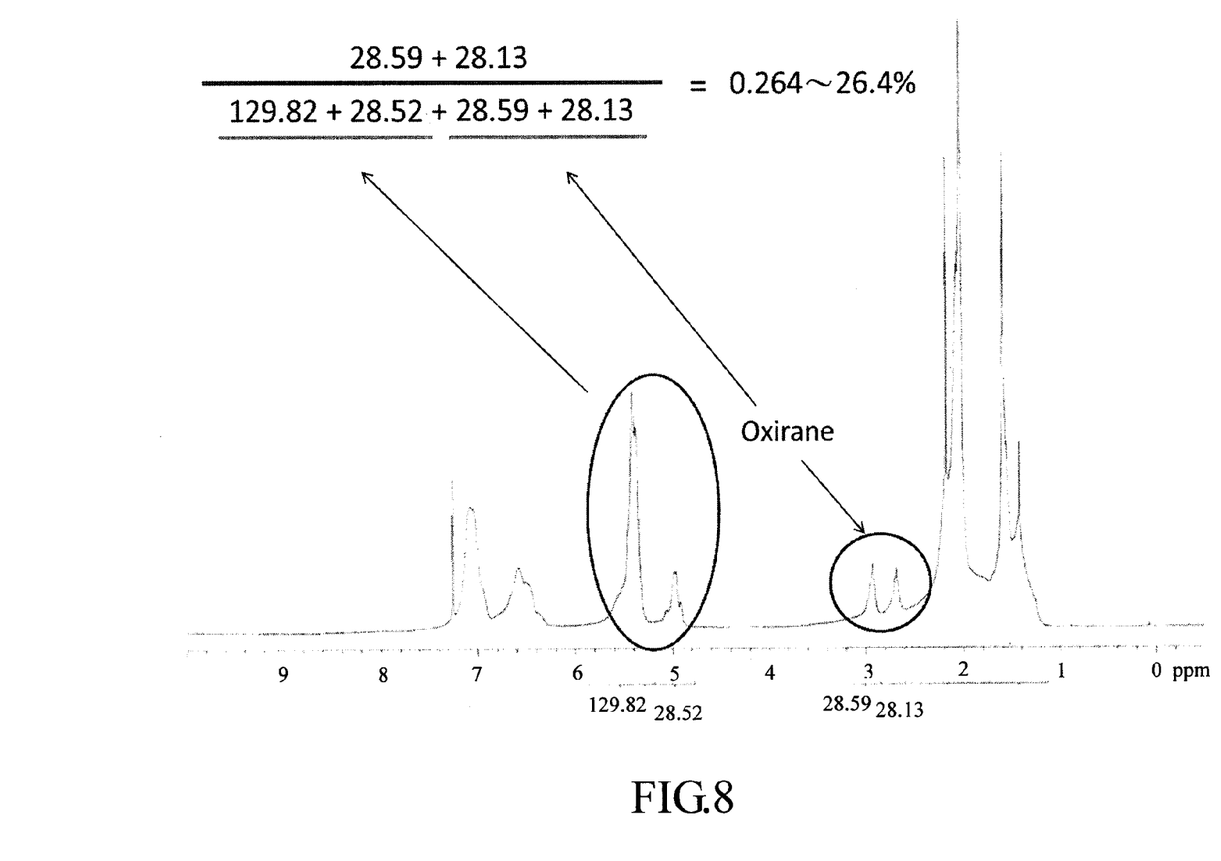

Referring to FIG. 8, peak 4.8-5.6 ppm represents the absorption peak of the remaining double bond which is not epoxidized after epoxidizing the SBS polymer. Peak 2.6-3.0 ppm represents the absorption peak of the oxirane.

The foregoing descriptions illustrate just the preferred embodiments of the present invention, and are not meant to limit the claim scope. The appended claims are intended to cover various modifications and similar arrangements included within the spirit of the invention.

What is claimed is:

1. A method for producing an epoxidized polymer, comprising the steps of:
   (1) providing a polymer solution containing a polymer made from at least one monomer having a conjugated diene group;
   (2) providing a catalyst solution dissolved in the polymer solution, the catalyst solution containing a transition metal ion and a ligand for bonding to the transition metal ion, the transition metal ion being selected from the group consisting of Ti, Mn, V, Mo, W and any combination thereof, and the ligand being selected from the group consisting of bipyridine, tetramethylethylenediamine (TMEDA), 2-methyl-pyridine and any combination thereof; and
   (3) epoxidizing double bonds originating from the conjugated diene group to produce the epoxidized polymer by providing an epoxidizing agent dissolved in the polymer solution containing the catalyst solution, wherein the epoxidizing agent is meta-chloroperoxybenzoic acid (mCPBA).

2. The method according to claim 1, wherein the step (3) further comprises: the transformation rate for transforming the double bond originating from the conjugated diene group into epoxy group being 5% to 60%.

3. The method according to claim 1, wherein the step (3) further comprises: the total weight-average molecular weight of the epoxidized polymer being 5,000 to 500,000.

4. The method according to claim 1, wherein the step (1) further comprises: dissolving the polymer with an organic solvent, wherein the organic solvent is selected from the group consisting of cyclohexane, toluene, tetrahydrofuran, xylene and any combination thereof.

5. The method according to claim 1, wherein the step (3) further comprises: reacting the polymer solution, containing the epoxidizing agent and catalyst solution, at room temperature and normal pressure for at least 2 hours.

6. A method for producing an epoxidized polymer, comprising the steps of:
   (1) providing a polymer solution containing a polymer made from at least one monomer having a conjugated diene group and a monomer having a vinyl aromatic group;
   (2) providing a catalyst solution dissolved in the polymer solution, the catalyst solution containing a transition metal ion and a ligand for bonding to the transition metal ion, the transition metal ion being selected from the group consisting of Ti, Mn, V, Mo, W and any combination thereof, and the ligand being selected from the group consisting of bipyridine, tetramethylethylenediamine (TMEDA), 2-methyl-pyridine and any combination thereof; and
   (3) epoxidizing double bonds originating from the conjugated diene group to produce the epoxidized polymer by providing an epoxidizing agent dissolved in the polymer solution containing the catalyst solution, wherein the epoxidizing agent is meta-chloroperoxybenzoic acid (mCPBA).

7. The method according to claim 6, wherein the step (3) further comprises: the transformation rate for transforming the double bond originating from the conjugated diene group into epoxy group being 5% to 60%.

8. The method according to claim 6, wherein the step (3) further comprises: the total weight-average molecular weight of the epoxidized polymer being 5,000 to 500,000.

9. A method for producing an epoxidized polymer, comprising the steps of:
   (1) providing a polymer solution containing a polymer made from at least one monomer having a conjugated diene group;

(2) providing a catalyst solution dissolved in the polymer solution, wherein the catalyst solution comprises titanium isopropoxide in combination with titanium-N,N'-ethylenebis(salicylimine) (Ti-Salen); and
(3) epoxidizing double bonds originating from the conjugated diene group to produce the epoxidized polymer by providing an epoxidizing agent dissolved in the polymer solution containing the catalyst solution, wherein the epoxidizing agent is meta-chloroperoxybenzoic acid (mCPBA).

10. A method for producing an epoxidized polymer, comprising the steps of:
(1) providing a polymer solution containing a polymer made from at least one monomer having a conjugated diene group and a monomer having a vinyl aromatic group;
(2) providing a catalyst solution dissolved in the polymer solution, wherein the catalyst solution comprises titanium isopropoxide in combination with titanium-N,N'-ethylenebis(salicylimine) (Ti-Salen); and
(3) epoxidizing double bonds originating from the conjugated diene group to produce the epoxidized polymer by providing an epoxidizing agent dissolved in the polymer solution containing the catalyst solution, wherein the epoxidizing agent is meta-chloroperoxybenzoic acid (mCPBA).

* * * * *